Patented May 30, 1939

2,160,782

UNITED STATES PATENT OFFICE 2,160,782

WATER SOLUBLE CELLULOSE ETHERS

Albert T. Maasberg, Midland, Mich., assignor to The Dow Chemical Company, Midland, Mich., a corporation of Michigan No Drawing. Application August 8, 1938,
Serial No. 223,695

3 Claims. (Cl. 260—231)

This invention relates to a method for the preparation of water-soluble cellulose ethers and more particularly water-soluble ethyl and methyl cellulose.

It has been known for many years that certain of the mono-alkyl ethers of cellulose are soluble in or are swelled by cold water. Such ethers have been reported variously as containing from 16 to 25 percent methoxyl in the case of methyl cellulose and correspondingly from about 25 to 33 per cent ethoxyl in the case of ethyl cellulose. In either instance the degree of substitution reported in the prior art has been equivalent to from about 1 to about 1½ or slightly more alkoxyl groups per anhydro glucose unit. In the ordinary procedure for preparing a water-soluble, lower alkyl ether of cellulose, considerable difficulty has been experienced in isolating the cellulose ether from the reaction medium, and such products as are obtained have been found to be somewhat colored, both in the dry form and in water solution. Many of the water-soluble lower alkyl ethers of cellulose heretofore prepared retain considerable amounts of inorganic matter, especially the salt which occurs as a by-product of the etherifying reaction. Owing in part to the difficulty of completely separating the ether from the reaction mixture, the yields in the prior art processes are generally low. The principal disadvantage inherent in the old processes is that they do not produce uniformly etherified products, hence the products obtained are not uniformly soluble.

It is, accordingly, among the objects of the present invention to provide a process whereby a water-soluble, lower alkyl ether of cellulose may be prepared which is uniformly soluble in cold water, which is low in ash and salt content, and which possesses a good white color. It is another object to provide a process whereby such ethers may be obtained in good yields and easily isolated from the reaction mixture. It is a further object of the invention to provide a process whereby a water-soluble methyl cellulose may be prepared having the aforesaid desired characteristics and in good yield.

I have now found that the foregoing objects may be attained by the use of an alkali cellulose of certain characteristics, and controlling the conditions of etherification and isolation of the product. The cellulose ethers made according to my present invention are soluble in cold water, form gels when a water solution is heated, precipitate as disperse particles in boiling water, and are obtained in good yields. The degree of substitution in the cellulose unit in the ethers which I have obtained is from about 25 to 33 per cent alkoxyl regardless of whether the alkoxyl group is methoxyl or ethoxyl. Expressed in terms of the number of substituent groups, the water-soluble ethyl cellulose made according to the present invention contains from about 1 to about 1.5 ethoxyl groups per unit, while the methyl cellulose contains from about 1.5 to about 2 methoxyl groups per unit. My invention resides in the discovery that cellulose ethers having the aforesaid desired characteristics can be produced by employing an alkali cellulose containing at least 0.9 part, but not substantially over 1.2 parts, of sodium hydroxide per part of cellulose, and containing at least 0.9 part, but not substantially more than 1.5 parts, of water per part of cellulose. According to my process, an alkali cellulose having the above-defined alkali to cellulose and water to cellulose ratios is caused to react with an alkylating agent such as a lower alkyl halide or a lower alkyl sulphate, and especially with methyl chloride, methyl bromide, (methyl iodide, ethyl chloride, ethyl bromide, or ethyl iodide, until the sodium hydroxide content of the alkali cellulose is substantially completely neutralized by interaction with the said alkylating agent.

I have found that if a lower alkali to cellulose ratio may be employed than 0.9:1, the alkoxyl content of the ether produced will be low, and its solubility in water will be non-uniform. When, however, an alkali cellulose is employed wherein the alkali to cellulose ratio varies between the rather closely defined limits of 0.9:1 to 1.2:1, the ether products obtained by reacting with a methyl or ethyl halide are found to be ethers of cellulose containing from 25 to 33 per cent alkoxyl groups, and having uniformly good solubility in cold water. For purposes of the present description, the term "cold water" will be employed to designate water below ordinary room temperature, i. e. below about 25° C. Once the water-soluble cellulose ethers are dissolved in cold water, the solution may be employed at temperatures up to 45°–50° C. without material gelation or precipitation.

The alkali cellulose conforming to the above requirements as to alkali and water content may be prepared by grinding or macerating a mixture of cellulose, alkali, and water in the proper proportion or it may be prepared by immersing a cellulose fiber aggregate in a bath of liquid sodium hydroxide solution having a concentration of between about 37.8 and about 57.2 per cent sodium hydroxide. The cellulose aggregate should be removed from the alkali bath as soon as it has absorbed from 1.8 to 2.7 times its weight of alkali solution, depending on the concentration of said solution, as shown by the following table.

| Concentration of alkali solution, percent | Weight of alkali solution per unit weight of cellulose to give desired alkali and water to cellulose ratios in the alkali cellulose | |
|---|---|---|
| | Minimum | Maximum |
| 37.8 | 2.4 | 2.4 |
| 40.0 | 2.25 | 2.5 |
| 42.5 | 2.12 | 2.6 |
| 45.0 | 2.0 | 2.7 |
| 47.5 | 1.89 | 2.53 |
| 50.0 | 1.8 | 2.4 |
| 52.5 | 1.89 | 2.29 |
| 55.0 | 2.0 | 2.18 |
| 57.2 | 2.10 | 2.10 |

When the cellulose has absorbed alkali solution of the stated concentration, in an amount between the limits given in the table, the alkali cellulose will contain between 0.9 and 1.2 parts of alkali and between 0.9 and 1.5 parts of water, per part of cellulose, and, when etherified with methyl or ethyl halide, will yield a uniform, cold-water-soluble methyl or ethyl cellulose. I have found that a greater or lesser proportion of alkali solution to cellulose provides an alkali cellulose which, when etherified, produces cellulose ethers which are non-uniform as to their water solubility.

In the etherification reaction, the amount of alkyl halide employed should be at least equivalent to the amount of alkali present in the alkali cellulose. It is preferable that the reaction be discontinued shortly before the alkali present is completely neutralized, i. e. while some alkali and some alkyl halide remain unreacted. This procedure permits isolation of the cellulose ether from an alkaline medium and avoids acid hydrolysis and degradation of the ether which may occur when the alkali is completely neutralized during etherification in the presence of excess etherifying agent. The temperature of etherification will vary depending upon the alkyl halide employed and the ease with which the alkyl halide reacts with alkali cellulose. In the case of methyl chloride, the etherification may be carried out in the range from 50°–100° C., or higher, and preferably at about 70° C., whereas in the case of ethyl chloride, higher temperatures, i. e., in the range from about 90° to about 120° C. are preferred. After the alkyl halide has reacted with nearly all of the alkali present in the alkali cellulose, the reaction vessel is cooled to stop the reaction and the crude alkyl cellulose is removed from the still slightly alkaline medium for purification. The product of reaction is characterized by its solubility in cold water and its insolubility in hot water. Advantage is taken of this fact to effect the purification by washing the product with water at a temperature above about 60° C., and preferably at a temperature between 85° and 100° C., to remove salts and to effect volatilization of any remaining alkyl halide or of any methyl or ethyl alcohol or ether formed as by-products during the reaction.

The following example illustrates the practice of my invention: 1.25 pounds of purified wood pulp was shredded until fluffy in a Baker-Perkins shredder. To the shredded cellulose was added 2.5 pounds of 50 per cent sodium hydroxide solution. Shredding was continued at 60° C. for 20 minutes while the cellulose absorbed the alkali solution. The alkali cellulose was cooled to about room temperature and 3.5 pounds of the material was placed in a pressure vessel to which methyl chloride was added from a cylinder until the internal pressure on the reaction vessel was 75 pounds gauge, or about 90 pounds absolute, per square inch. The temperature of the reaction mixture was gradually raised to 70° C. over a period of one hour. Additional methyl chloride was introduced periodically during the first three hours of etherification and whenever necessary thereafter to maintain a pressure of about 75 pounds per square inch in the reaction chamber. Heating was continued for 12.5 hours at 70° C. and a total of 1.5 pounds of methyl chloride was supplied to the reaction vessel, although only a little over 1 pound reacted. At the end of this period, the reactor was cooled, the remaining methyl chloride was vented to a recovery system, and the reaction mixture containing crude methyl cellulose was removed from the pressure vessel. Nearly all of the alkali present was neutralized during the reaction, only 0.6 per cent of the weight of methyl chloride-free reaction mixture being sodium hydroxide. The methyl cellulose was washed with hot distilled water in a basket-type centrifuge until free of sodium hydroxide and salt. The temperature of the water used for washing the product was from 85° to 90° C. A methyl cellulose yield of about 95 per cent was obtained, based on the cellulose employed.

A 5 per cent solution of the so-formed methyl cellulose in distilled water at 20° C. had a viscosity of 59 seconds as measured in a standard bubble viscometer, the tubes of which have an internal diameter of 1.5 centimeters and a total length of 70 centimeters with the graduations 50 centimeters apart. The length of the bubble in the tube was 4 centimeters. The methyl cellulose had an ash content of 0.12 per cent and a methoxyl content of 29.0 per cent. When 100 cc. of a 1 per cent solution of the methyl cellulose in cold water (5° C.) was centrifuged in a graduated tube at 2000 R. P. M. for 15 minutes, only a minute trace of a watery gel was thrown to the bottom of the tube.

The water-soluble methyl cellulose prepared as described in the above example had an unusually low ash content and high uniform solubility in cold water when compared with methyl cellulose as ordinarily obtainable from the heretofore-described processes.

The properties of three different viscosity types of methyl celluose prepared according to the present invention were compared with corresponding viscosity types of two other samples of commercially available water-soluble methyl cellulose. The compound prepared according to the present invention is designated in the following table as A, while the commercial samples are designated as B and C, respectively.

| Sample | Viscosity type | Viscosity, seconds | Percent ash on combustion | Percent methoxyl | Color |
|---|---|---|---|---|---|
| A | Low | 12.0 | 0.9 | 31.2 | White |
| B | do | 11.2 | 0.26 | 21.7 | YB* |
| C | do | 23.0 | 2.54 | 16.1 | White |
| A | Medium | 80 | | 30.4 | White |
| B | do | 73 | 0.3 | 23.7 | YB* |
| C | do | 143 | 3.2 | 19.0 | White |
| A | High | 708 | 0.17 | 25.0 | White |
| B | do | 421 | 0.44 | 24.9 | YB* |
| C | do | 283 | 2.76 | 17.2 | White |

*YB=yellow-brown tinge.

From the standpoint of color, the methyl cellulose prepared according to the present invention was equal to or better than the color of other commercially available samples. Samples A and B in all these viscosity types were both characterized by solubility in cold water and insolubility in hot water. Sample B had an undesirable yellowish tinge both in the dry form and in water solution. Sample C was characterized by good solubility in cold water and fairly high solubility in hot water. For this reason the ash content of the various C samples was considerably higher than the corresponding sample made according to the present invention, as the inorganic matter could not be removed by washing with hot water. Samples B and C were both characterized by lower alkoxyl content (16.1–24.9 per cent vs. 25–31.2 per cent) and by less uniform solubility than sample A. The present invention then provides a uniformly cold-water-soluble cellulose ether which can be purified by the simple process of washing with hot water and which has a low ash content and an excellent white color.

The actual temperature at which methyl cellulose, prepared according to the present invention, may be precipitated from aqueous solution depends to a great extent upon the concentration of the said aqueous solution. The following table illustrates the gelation characteristics of a sample of low viscosity methyl cellulose which could be dissolved in cold water and which would remain in solution therein at temperatures up to about 45° C. without any sign of precipitation.

*Gelation and precipitation of methyl cellulose from water solution upon heating*

| Concentration of aqueous solution, percent | Temp. at which gelation is first observed, °C. | Temp. at which solid gel forms, °C. | Temp. at which disperse precipitate forms, °C. |
|---|---|---|---|
| 0.5 | (*) | | |
| 1.0 | (*) | | |
| 2.0 | | 59 | 67 | 85–100 |
| 3.0 | | 50 | 59 | 85–100 |
| 4.0 | | 51 | 56 | 85–100 |
| 5.0 | | 44 | 51 | 85–100 |

*No apparent gel or precipitate formed up to 100° C. Solutions became slightly cloudy at about 59°–62° C.

Methyl cellulose of the herein-described type is useful for a variety of purposes. It may be "printed" from cold water solution onto cloth, and "set" by means of heat, to produce a damask effect, or the so-treated cloth may be dyed and the water-soluble methyl or ethyl cellulose removed by the action of cold water, thus producing a novel print effect. The water-soluble ethers are also useful in the preparation of various adhesive compositions, emulsions, etc.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. The process which comprises reacting an alkali cellulose containing at least 0.9 and not substantially greater than 1.2 parts of sodium hydroxide and at least 0.9 and not substantially greater than 1.5 parts of water per part of cellulose, by weight, with an alkylating agent selected from the class consisting of the methyl and ethyl halides and sulphates, the alkylating agent being supplied in quantity at least equivalent to the sodium hydroxide present, continuing the reaction until the alkali cellulose is substantially completely neutralized, and discontinuing the reaction while the reaction mixture is still slightly alkaline, thereby to produce a uniform cold-water-soluble, lower alkyl ether of cellulose containing from about 25 to about 33 per cent alkoxyl groups, and characterized by solubility in water at temperatures below room temperature and insolubility in water at temperatures above 65° C.

2. The process which comprises reacting an alkali cellulose containing at least 0.9 and not substantially greater than 1.2 parts of sodium hydroxide and at least 0.9 and not substantially greater than 1.5 parts of water per part of cellulose, by weight, with a methyl halide, the latter being supplied in quantity at least equivalent to the sodium hydroxide present, continuing the reaction until the sodium hydroxide in the alkali cellulose is substantially completely neutralized, and discontinuing the reaction while the reaction mixture is still slightly alkaline, thereby to produce a uniform cold-water-soluble methyl cellulose containing from about 25 to about 33 per cent methoxyl groups and characterized by solubility in water at temperatures below room temperature and insolubility in water at temperatures above 65° C.

3. The process according to claim 2, wherein the methyl halide is methyl chloride and the temperature of methylation is between about 50° and about 100° C.

ALBERT T. MAASBERG.